May 23, 1933. S. CHRISTENSEN 1,910,379
SAFETY DEVICE FOR AIRCRAFT
Filed March 16, 1929 2 Sheets-Sheet 2
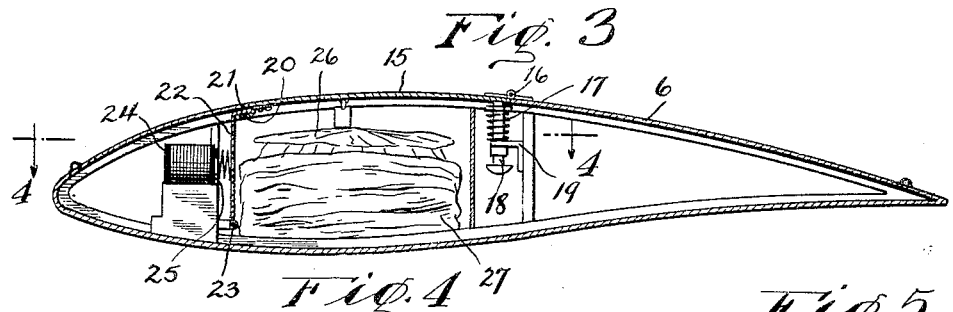
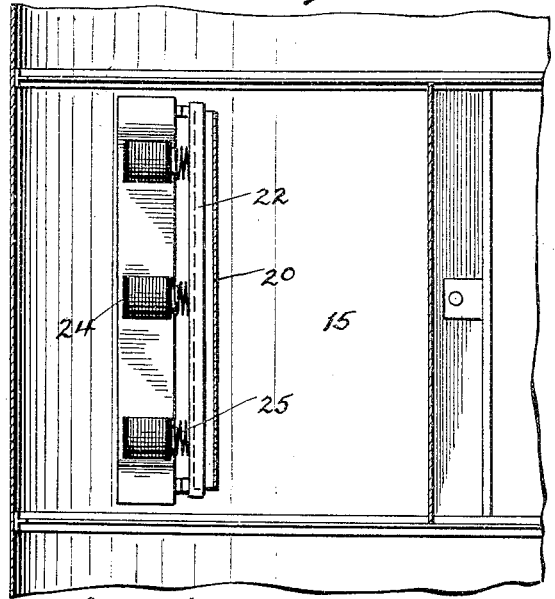
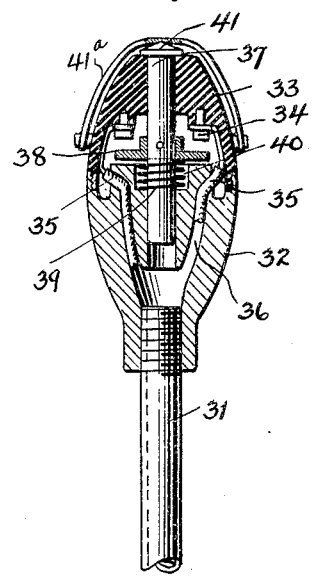
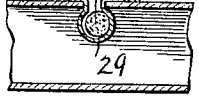
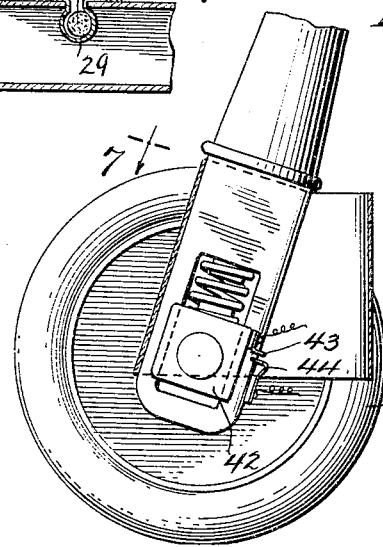
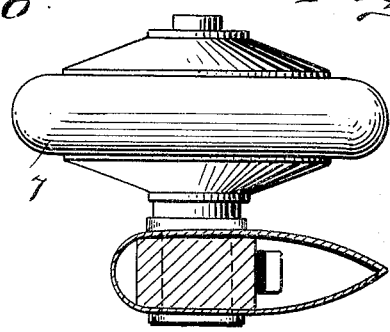
Inventor
Sabinus Christensen, a minor
By his mother Inga N. Christensen
By his Attorney
Aaron L. Applebaum Patented May 23, 1933

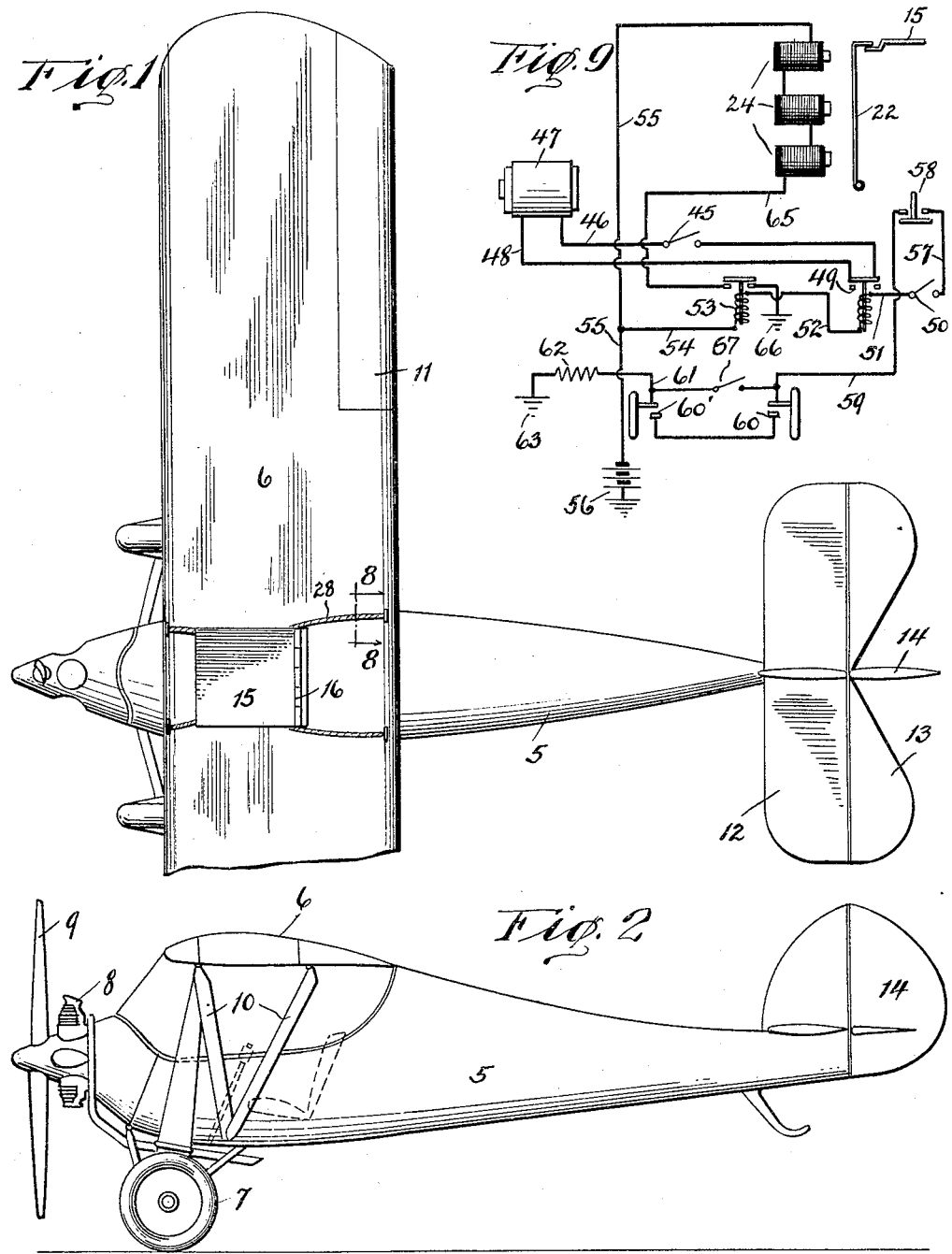

1,910,379

UNITED STATES PATENT OFFICE

SABINUS CHRISTENSEN, OF ATLANTIC CITY, NEW JERSEY

SAFETY DEVICE FOR AIRCRAFT

Application filed March 16, 1929. Serial No. 347,722.

This invention relates to improvements in safety devices and appliances for aeroplanes.

One of the objects of my invention resides in a parachute releasing mechanism associated with the main wing of an aeroplane, constructed and arranged for releasing captive parachutes.

Another object of my invention is to provide a safety device for aeroplanes including captive parachutes concealed within the body of the main wing, automatically releasable at the will of the operator.

A continued object of my invention resides in a safety device for aeroplanes embodying captive parachutes and automatic releasing mechanism constructed and arranged for cooperation with a door on the top of the main wing, said mechanism and parachutes being releasable at the will of the operator.

To enable others skilled in the art to more fully comprehend the underlying features of my invention, reference is had to the accompanying drawings forming a part of the specification in which Fig. 1 is a partial top plan showing the main wing and releasable door for the parachutes.

Fig. 2 is a side view.

Fig. 3 is a section through the main wing showing the position of the magnets, parachute and releasable door.

Fig. 4 is a view taken on the line 4—4 of Fig. 3.

Fig. 5 is a section showing the joy stick switch.

Fig. 6 is a detail showing the ground wheel and ground wheel switch.

Fig. 7 is a view taken on the line 7—7 of Fig. 6.

Fig. 8 is a section taken on the line 8—8 of Fig. 1.

Fig. 9 is a diagrammatic view of the electric circuit of the releasing mechanism.

Referring now to the drawings wherein like reference numerals designate corresponding parts throughout the several views, for purposes of illustration, I have shown a conventional type of aeroplane comprising the body 5, cambered main wing 6, landing gear and ground wheels 7, radiator 8 and propeller 9. Connected to the main wing are the struts 10 which together with the aileron 11, fixed horizontal stabilizer 12, elevator 13 and rudder 14 comprise the standard elements of the monoplane as shown.

Referring to Figs. 1 and 3, I have shown the top 14 of the cambered wing equipped with a door 15 hingedly connected as at 16. Bearing against the door adjacent the hinged connection is a spring 17 on a rod 18 held by a notched bracket 19 whereby said door may quickly fly open when released. The front edge of the door is equipped with a bent extension plate 20 engaged by the flange 21 of a pivoted plate 22, said plate being pivoted at 23 within the cambered wing. Normally, the pivoted plate is in engagement with the door which however may be released by means of a series of coils 24 and spring magnets 25 included in an electric circuit subsequently to be described.

Connected to the inside wall of the door, I provide a pilot parachute 26 which is adapted to release folded main parachute or parachutes 27 connected by guys 28 attached to the body of the plane, said guys lying in channels 29 formed by flanged, metal strips 30 on the top wing surface. When the door is released, the pilot parachute attached thereto opens and carries with it the main parachute or parachutes, which are of such a size as to permit the plane to descend without a crash. In actual practice, the pilot parachute tears away from the door as soon as it is opened and its only purpose is to quickly release the main parachutes as when the engine goes dead or the pilot falls asleep or some defect in the operation of the plane develops which does not permit of a safe landing. If for instance motor trouble necessitates a landing, the main wing, stabilizer, elevator and rudder may be set to assist in making a landing, the purpose of the parachutes being to prevent a nose dive or tail spin.

The circuit controlling the parachute releasing mechanism is preferably operable from the joy stick switch as shown in Fig. 5. The joy stick 31 is provided with a handle 32 having an insulated cap 33 detachably connected thereto. Fixed contacts 34 and leads 35 passing through channels 36 of the handle and through the handle cooperate with a spring controlled push rod 37 having a contact collar 38, said collar being engaged by a spring 39, the bottom of which is seated in an opening 40. The rod is slidable in aligned openings in the handle and insulated top so that by depressing the knob or top 41 of the rod by the thumb, the operator may keep the circuit open or broken. There is also provided a hinged band or strap 41a which may be employed to maintain the rod in its depressed position so that by releasing the band or strap, the circuit may be closed thus actuating the door releasing mechanism whereby the parachutes may be released.

In Figs. 6 and 7, I have also shown a landing gear switch included in the circuit in which the axle bearing 42 is equipped with a contact 43 cooperating with a contact 44 on the landing gear, said contacts being or capable of being closed when the weight of the machine is off the ground wheels and open when the machine taxies or is on the ground.

Referring now to the diagrammatic circuits illustrated by Fig. 9, the automatic control and the respective circuits may be traced as follows. An engine circuit which represents the source of power and the means required for the ignition of an internal combustion engine 47, is represented by a hand switch 45, a lead 46 connecting said hand switch to the engine 47, a return lead 48 which leads to a solenoidal switch 49 and a return lead connecting switch 49 to the hand switch 45. The solenoid switch 49 is normally closed, so that the function of the engine circuit may be controlled by the hand switch 45 on the dash board. Energization of solenoid switch 49 will open said switch, interrupting the engine circuit and bringing the engine to a stop. The solenoid of switch 49 forms part of the main circuit which controls the parachute releasing mechanism when the main circuit controlling the parachute releasing mechanism is excited, the solenoid switch 49 is actuated thereby and the engine comes to a stop.

The main circuit controlling the parachute releasing mechanism is traced as follows. From the hand switch 50 on the dash board through lead 51 to relay control switch 49, lead 52 to a second relay switch 53 to leads 54, 55 to battery 56 which is grounded. The opposite lead 57 of hand switch 50 passes through the joy stick switch 58, lead 59 through ground wheel switches 60, 60', continuing through lead 61, resistance coil 62 to ground 63. By closing switch 53 I complete the secondary circuit of the parachute control. The current supply from the battery 56 through lead 55 energizes coils 24 which release plate 22 from door 15 which flies open. The return lead 65 from coils 24 is grounded to the frame or fuselage at 66 in the usual manner. A special emergency switch 67 is also provided in the circuit to the ground wheels so that in case either of said wheels are damaged or become disconnected, the parachute releasing mechanism may be employed to effect a safe landing.

While I have shown and described my invention with some degree of particularity, it will be realized that other modifications and changes may be resorted to under special conditions. I therefore do not wish to be limited and restricted to the exact details shown and described but reserve the right to make such changes and modifications as may fairly fall within the scope of the subject matter now being claimed.

Having shown and described my invention what I claim as new and desire to secure by Letters Patent is:—

1. In combination with the main wing of an aeroplane, a door hinged to the top of said wing, a captive parachute and a pilot parachute concealed within the body of the wing and releasable when the door is opened, electrically operated means for automatically opening said door including in their circuit a switch carried by the joy stick of said aeroplane whereby said means are rendered operative at the will of the operator only when the aeroplane is in flight, a second switch for breaking said circuit to render the parachute releasing mechanism inoperative, and a third switch in said circuit controlled by the load on and connected with the ground wheels of said aeroplane.

2. In combination with an aeroplane, a door hinged to the top of said aeroplane, a lock on said door, a parachute connected with said door and adapted to be exposed to the air surrounding said aeroplane when said door is opened, an electric circuit controlling said lock on said door, a switch in said circuit connecting with the ground wheels of said aeroplane and controlled by the load on said ground wheels, and a normally open switch in said circuit mounted upon the end of the joy stick.

3. In combination with an aeroplane, a door hinged to the top of said aeroplane, a lock on said door, a parachute connected with said door and exposed to the air surrounding said aeroplane by the opening of said door, an electric circuit controlling said lock on said door, a switch in said circuit connected with the ground wheels of said aeroplane and open when said ground wheels are off the ground, and a normally open switch in said circuit mounted upon the end of the joy stick.

In testimony whereof I affix my signature.

SABINUS CHRISTENSEN.